(12) United States Patent
Barmore

(10) Patent No.: US 6,889,280 B1
(45) Date of Patent: May 3, 2005

(54) MOTHERBOARD EXTENSION FEATURES TO PROVIDE PLUG AND PLAY INFORMATION

(75) Inventor: Brad A. Barmore, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 401 days.

(21) Appl. No.: 09/607,680

(22) Filed: Jun. 30, 2000

(51) Int. Cl.$^7$ .............................................. G06F 13/00
(52) U.S. Cl. ............................. 710/301; 710/1; 710/63; 710/300; 710/305
(58) Field of Search .............................. 710/1, 63, 300, 710/301, 305, 126, 129, 101, 102; 375/222

(56) References Cited

U.S. PATENT DOCUMENTS

| | | | | |
|---|---|---|---|---|
| 5,519,573 A | * | 5/1996 | Cobb et al. ................... | 361/686 |
| 5,594,621 A | * | 1/1997 | van Rumpt ................... | 361/686 |
| 5,604,871 A | * | 2/1997 | Pecone ........................ | 710/301 |
| 5,655,106 A | * | 8/1997 | Smith .......................... | 703/23 |
| 5,765,008 A | * | 6/1998 | Desai et al. ................. | 710/301 |
| 5,835,346 A | * | 11/1998 | Albani et al. ............... | 361/684 |
| 5,889,970 A | * | 3/1999 | Horan et al. ................ | 710/312 |
| 5,961,618 A | * | 10/1999 | Kim ............................ | 710/300 |
| 6,345,072 B1 | * | 2/2002 | Liu et al. .................... | 375/222 |
| 6,363,450 B1 | * | 3/2002 | Lash et al. ................... | 710/301 |
| 6,611,912 B1 | * | 8/2003 | Maleck et al. ............... | 713/100 |
| 2001/0014927 A1 | * | 8/2001 | Chang et al. ................ | 710/102 |

OTHER PUBLICATIONS

Enhanced Riser Card with Expansion Function Capability for Personal Computers, IBM Technical Disclosure Bulletin, Jul. 1994, US. vol. No.: 37, Issue No.: 7, pp. 189–192.*

* cited by examiner

*Primary Examiner*—Kim Huynh
*Assistant Examiner*—Angel L. Casiano
(74) *Attorney, Agent, or Firm*—Blakely, Sokoloff, Taylor & Zafman LLP

(57) ABSTRACT

A riser card with a corresponding interface on a motherboard can reduce the overall cost of an electronic system as well as simplify upgrading the features provided by the riser. Implementation costs can be reduced, for example, for audio components that may otherwise require shielding in order to prevent electromagnetic interference if the audio component were located on the motherboard. Other components can also be simplified if located on a riser rather than the motherboard. Upgrading of features supported by the riser card is simplified because the riser card can be replaced. The riser card described herein provides Plug-and-Play functionality so that an operating system controlling the electronic system in which the riser card is included can load the appropriate driver software thereby simplifying operation of the electronic system.

27 Claims, 7 Drawing Sheets

MOTHERBOARD EXTENSION FEATURES TO PROVIDE PLUG AND PLAY INFORMATION

FIELD OF THE INVENTION

The invention relates to electronic systems, such as computer systems, thin clients, or set top boxes. More particularly, the invention relates to riser cards providing electronic system motherboard feature extension with plug and play functionality.

BACKGROUND OF THE INVENTION

Electronic system motherboards are becoming increasingly integrated to support a growing number of features and/or more compact packaging. The motherboard is the physical arrangement that contains the system's basic circuitry and components. Typically, motherboards have circuitry imprinted or affixed to the surface of a printed circuit board (PCB) or other similar component. Motherboards commonly include the microprocessor, co-processors (if any), memory, basic input/output system (BIOS), expansion slots, and interconnecting circuitry. Additional components can be coupled to a motherboard through its expansion slots. Common expansion slot standards are the Peripheral Component Interconnect (PCI) standards available from the PCI Special Interest Group of Portland, Oreg.

However, motherboard integration of features traditionally included in common expansion slots has been problematic for several reasons including Federal Communications Commission (FCC) and international telecommunications certification, motherboard space and other manufacturer specific requirements. FCC and international telecommunications certifications require, for example, that an electronic system not interface in frequency ranges reserved for other uses (e.g., 900 MHz telephones). Increased integration is performed to decrease the overall cost of the computer system.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

Methods and apparatuses for motherboard and riser card Plug-and-Play (PnP) functionality support are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

A riser card is an extension of the motherboard to which it is attached. Logically, the riser card is a portion of the motherboard. Physically, the riser card is attached to the motherboard through a connector or other type of interface, and can be more easily removed and replaced than typical motherboard-mounted components. Thus, like motherboard mounted components, the functionality of the riser card is typically determined during boot up of the system.

A riser card with a corresponding interface on a motherboard can reduce the overall cost of an electronic system as well as simplify upgrading the features provided by the electronic system. Implementation costs can be reduced, for example, for sensitive analog components that may otherwise require shielding in order to prevent electromagnetic interference if the same analog components were located on the motherboard. Other components can also be simplified if located on a riser rather than the motherboard. Upgrading of features supported by the electronic system is simplified because the riser card can be installed or replaced to enhance the existing features of the electronic system. The riser card described herein provides PnP functionality so that an operating system controlling the electronic system in which the riser card is included can load the appropriate driver software thereby simplifying operation of the electronic system.

Figure 1:
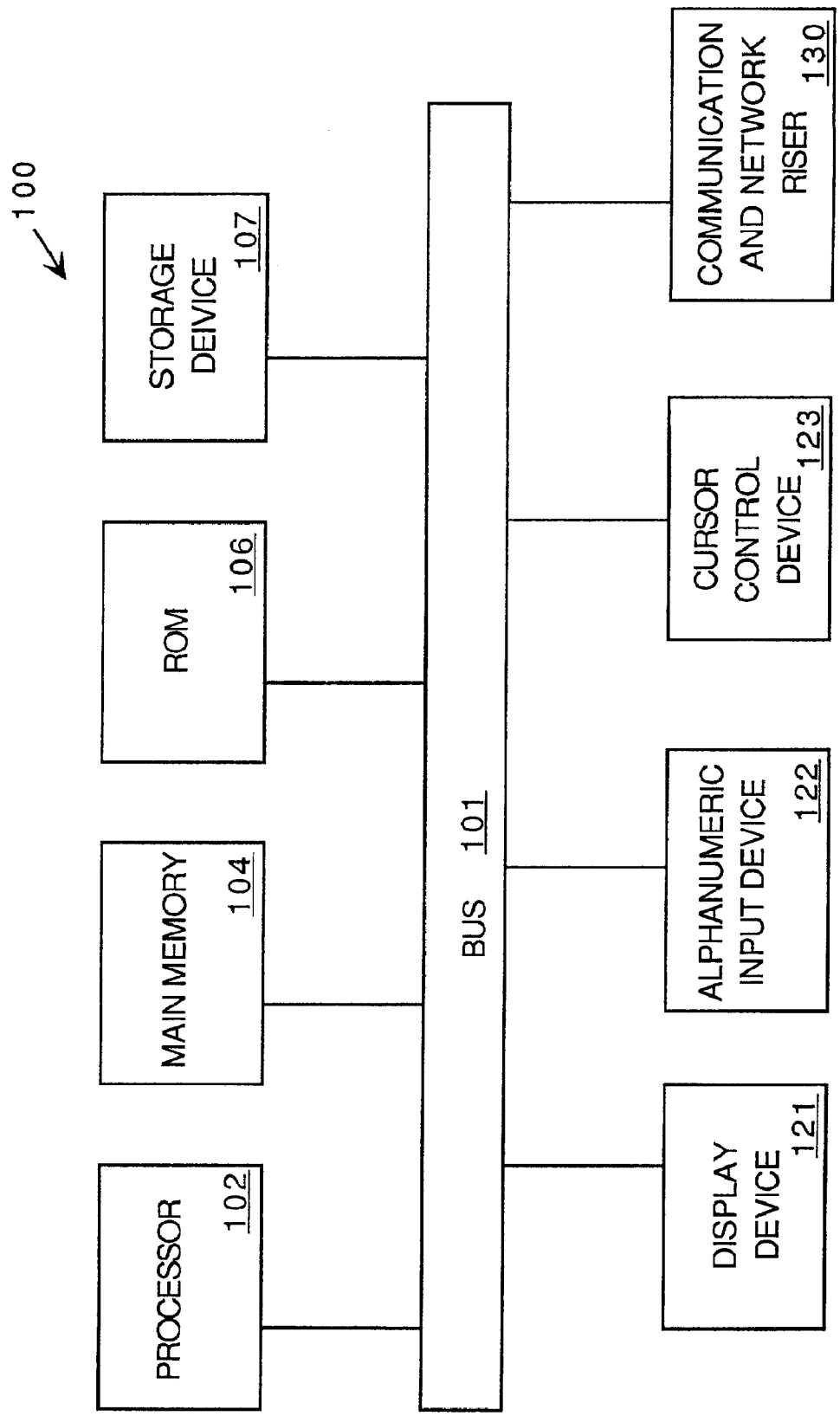
FIG. 1 is a block diagram of one embodiment of an electronic system.

FIG. 1 is a block diagram of one embodiment of an electronic system. The system illustrated in FIG. 1 is intended to represent a range of electronic systems including, but not limited to, computer systems, set top boxes and thin clients. Alternative systems can include more, fewer and/or different components.

System 100 includes bus 101 or other communication device to communicate information, and processor 102 coupled to bus 101 to process information. While system 100 is illustrated with a single processor, system 100 can include multiple processors and/or co-processors. System 100 further includes random access memory (RAM) or other dynamic storage device 104 (referred to as main memory), coupled to bus 101 to store information and instructions to be executed by processor 102. Main memory 104 also can be used to store temporary variables or other intermediate information during execution of instructions by processor 102.

System 100 also includes read only memory (ROM) and/or other static storage device 106 coupled to bus 101 to store static information and instructions for processor 102. Data storage device 107 is coupled to bus 101 to store information and instructions. Data storage device 107 such as a magnetic disk or optical disc and corresponding drive can be coupled to system 100.

System 100 can also be coupled via bus 101 to display device 121, such as a cathode ray tube (CRT) or liquid crystal display (LCD), to display information to a computer user. Alphanumeric input device 122, including alphanumeric and other keys, is typically coupled to bus 101 to communicate information and command selections to processor 102. Another type of user input device is cursor control 123, such as a mouse, a trackball, or cursor direction keys to communicate direction information and command selections to processor 102 and to control cursor movement on display 121.

System 100 further includes Communication and Network Riser (CNR) 130 to provide access to a network, such as a local area network, as well as provide communications functionality, such as audio input/output, Local Area Network (LAN) or a modem connection. As described herein, CNR 130 is used as an exemplary riser card. Other types of riser cards providing other types of functionality can be similarly supported. In one embodiment, CNR 130 physically separates noise sensitive systems from the noisy environment of the motherboard. Placing the communications and networking components on CNR 130 also simplifies motherboard design and provides easier upgrade of communications and networking components.

As described in greater detail below, CNR 130 provides PnP functionality. In one embodiment, CNR 130 includes an Electrically Erasable Programmable Read only Memory (EEPROM) or other memory device (not shown in FIG. 1) that provides sufficient information related to the functionality of CNR 130 that a Basic Input/Output System (BIOS), operating system, or other service can load the appropriate drivers to support the functionality of the CNR 130. In one embodiment, the BIOS, operating system, or other service is represented as a sequence of instructions in a machine-readable medium.

As used herein, a machine-readable medium includes any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals), etc.

Figure 2:
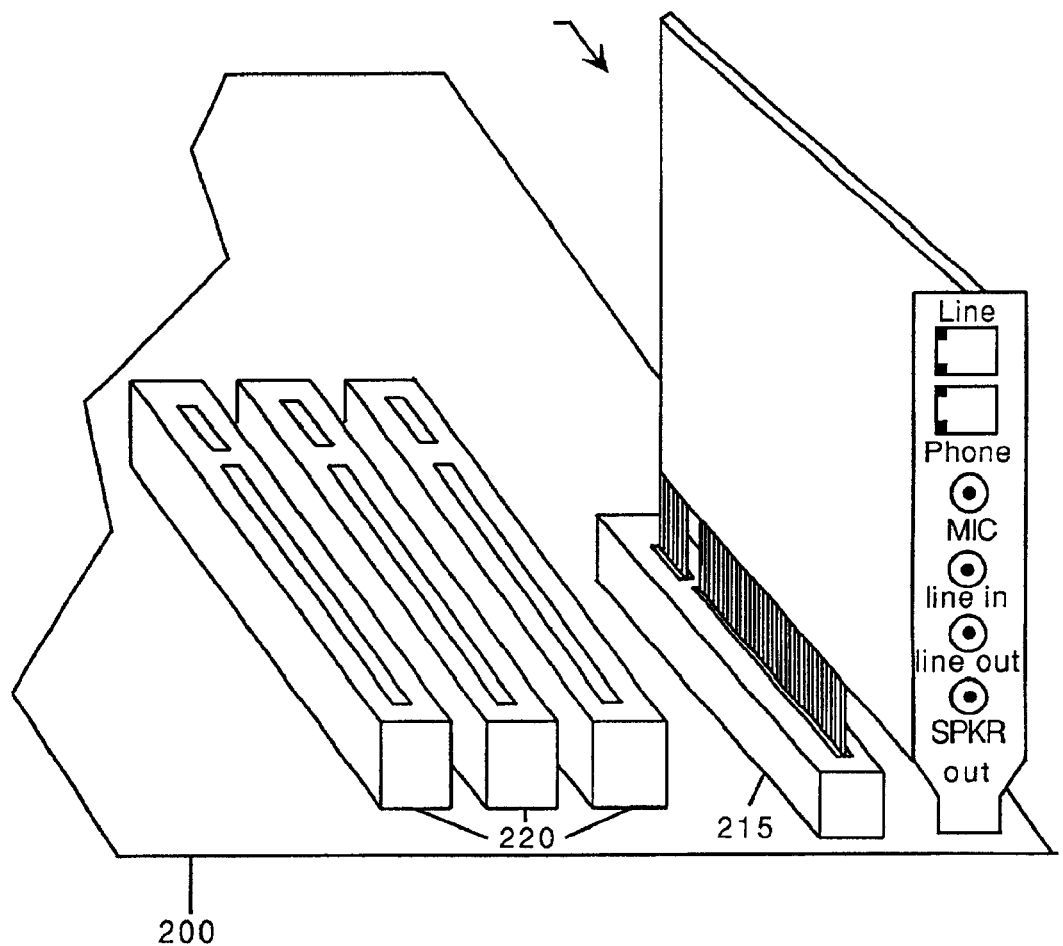
FIG. 2 illustrates one embodiment of a Communications and Networking Riser (CNR) and associated slot.

FIG. 2 illustrates one embodiment of a Communications and Networking Riser (CNR) and associated slot. In one embodiment, motherboard 200 includes multiple expansion slots 220 as well as a CNR slot 215 to receive a CNR card 130. In one embodiment, expansion slots 220 are Peripheral Component Interconnect (PCI) expansion slots. In alternate embodiments, other types of expansion slots can be provided. Use of such industry standard expansion slots is well known in the art. In alternate embodiments other types of risers or motherboard extensions can be provided.

In general, a riser card is a logical extension of the motherboard. In other words, the riser card operates as if it were a part of, or coupled to, the motherboard. In contrast, expansion card, such as PCI expansion cards, operate independent of the motherboard.

In one embodiment, slot 215 is also coupled to motherboard 200. In FIG. 2, slot 215 is illustrated as a female connector; however, slot 215 can be implemented as a male connector. CNR 130 is configured to connect to slot 215. CNR 130 includes hardware components for use with the components of motherboard 200. For example, CNR 130 can include modem hardware, audio codec hardware, network interface hardware, etc. One or more of the hardware components of CNR 130 has a corresponding software driver that is executed by a processor on motherboard 200.

Identification and loading of the proper software drivers is described in greater detail below. In one embodiment, CNR 130 supports multi-channel audio, V.90 analog modem, phone-line based networking and/or 10/100 Ethernet based networking. In alternate embodiments, CNR 130 supports additional and/or different services (e.g., wireless networking, video, other modem protocols, etc.).

Figure 3:
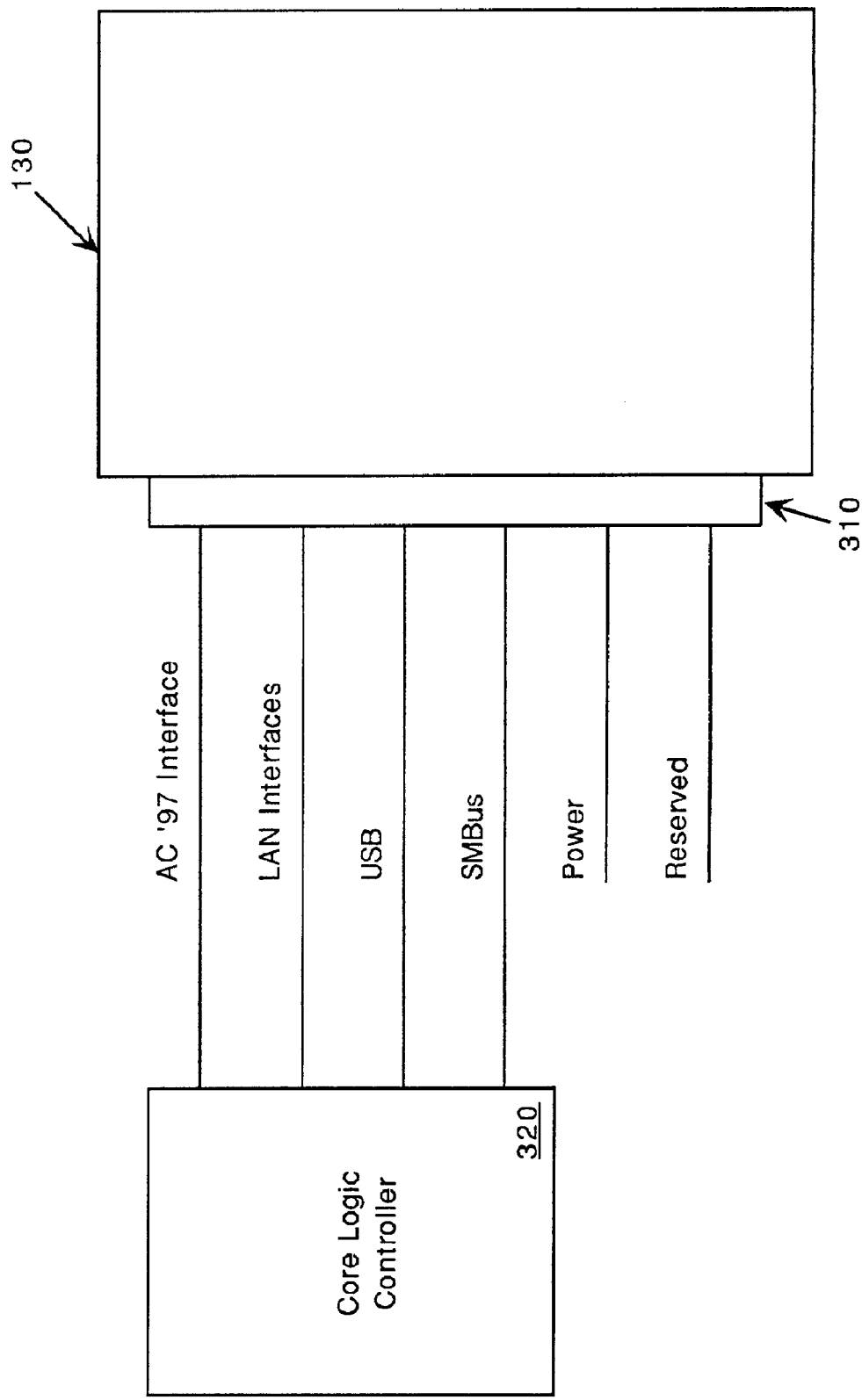
FIG. 3 illustrates a block diagram of one embodiment of a CNR interface.

FIG. 3 illustrates a block diagram of one embodiment of a Communication and Networking Riser (CNR) interface. The block diagram of FIG. 3 illustrates several specific interfaces; however, any number or types of interfaces can be supported. Thus, the description with respect to FIG. 3 is for explanation purposes and should not be read as limiting as to the interfaces that can be provided between a riser card and a motherboard.

The specific interfaces illustrated in FIG. 3 are Audio Codec '97 (AC '97), one or more network interfaces (LAN interfaces), a Universal Serial Bus (USB) interface, a System Management Bus (SMBus) interface, power lines and a set of reserved lines. In alternate embodiments, other interfaces can be provided. Core logic controller 320 performs the control functions on motherboard 200. Use and configuration of core logic controller 320 are known in the art.

AC '97 is described in Audio Codec '97 Component Specification, Revision 2.1 published May 22, 1998 by Intel Corporation. In one embodiment, two AC '97 codecs are supported; however, any number of AC '97-compliant codecs can be supported. LAN interfaces generally refers to a set of signals to communicate via a network according to an appropriate protocol. USB is described in Universal Serial Bus Specification, Revision 1.1, published the USB Implementer's Forum (USB-IF) of Portland, Oreg. The System Management Bus Version 1.1 interface specification is available from Intel Corporation of Santa Clara, Calif.

Figure 4:
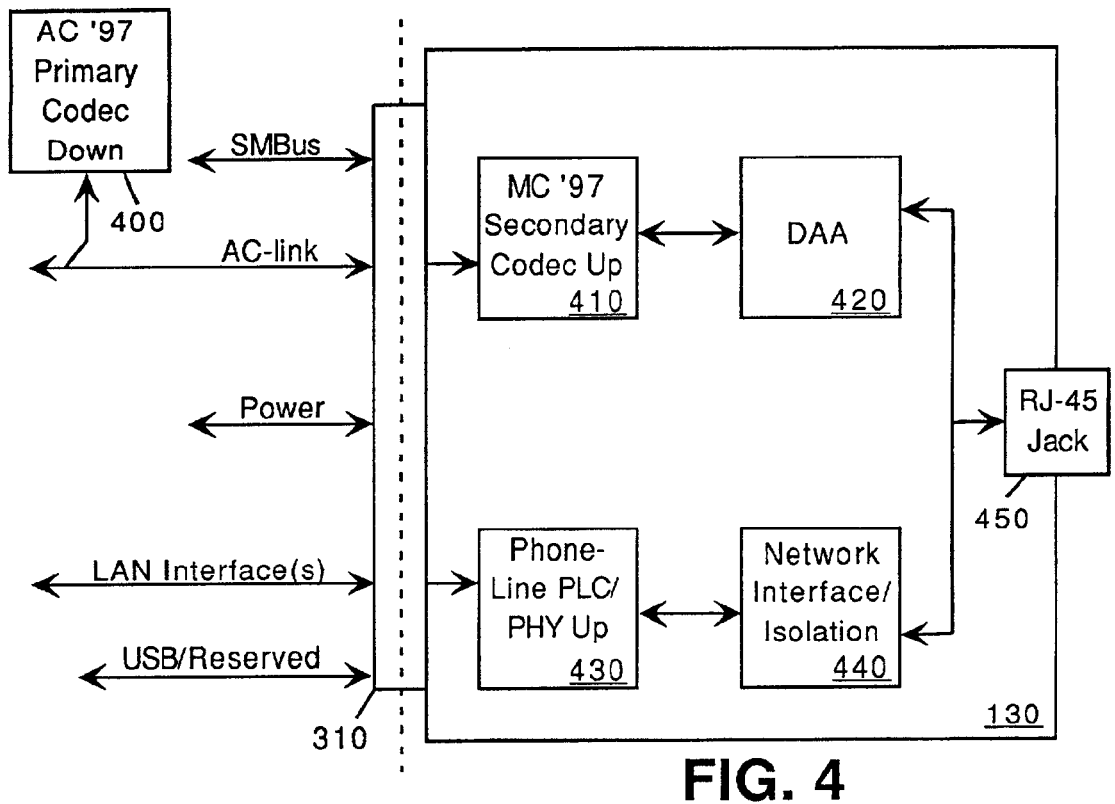
FIG. 4 illustrates one embodiment of a CNR providing an analog modem with a phone line network interface, in an electronic system containing an audio codec.

FIG. 4 illustrates one embodiment of a CNR providing an audio-down codec, modem codec, and a phone line network interface. In the embodiment, the AC '97 primary codec down 400 is located on the motherboard and is coupled with CNR 130 via the AC '97 portion of interface 310. CNR 130 includes a MC '97 secondary codec up coupled with the AC '97 portion of interface 310. A Data Access Arrangement (DAA) 420 is coupled to codec 410. DAA 420 is an electronic interface between codec 410 and a public telephone line via RJ-11 jack 450. A DAA is also sometimes called a Telephone Line Interface Circuit (or Module). DAAs are typically required in any device that attaches to the public switched telephone network (PSTN), including fax machines, PBXs, set-top boxes, and alarm systems. Among other things, DAA 420 isolates the electronic device from the higher voltage on the telephone line.

Phone-line PLC/PHY up 430 and network interface/isolation circuit 440 is also coupled between the LAN interface portion of 310 and RJ-11 jack 450 to provide a networking interface. Other components (e.g., USB components, EEPROM or other memory), which are not shown for reasons of simplicity of description, can also be included on CNR 130.

Figure 5:
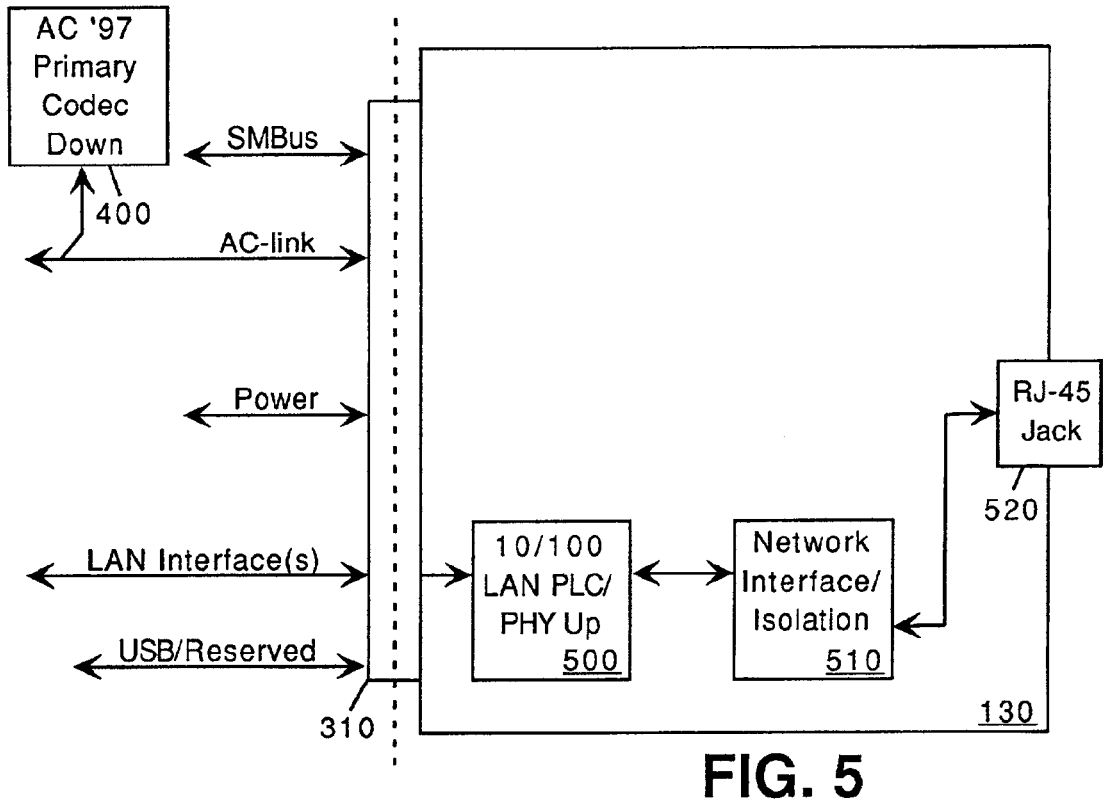
FIG. 5 illustrates one embodiment of a CNR providing an audio-down codec with a 10/100 LAN interface in an electronic system containing an audio codec.

FIG. 5 illustrates one embodiment of a CNR providing an audio-down codec with a 10/100 LAN interface. CNR 130, as illustrated in FIG. 5, supports Ethernet-based networking with 10/100 LAN PLC/PHY up 500, network interface/ isolation 510 and RJ45 jack 520. In one embodiment, CNR 130 also includes the codecs and other components described above.

Figure 6:
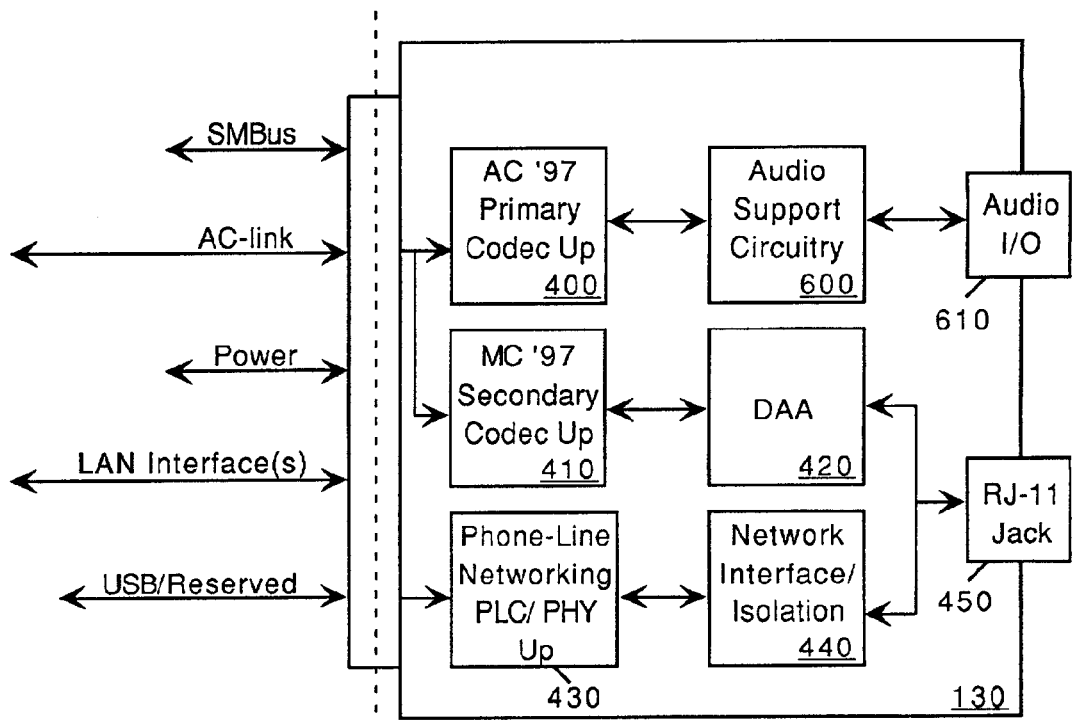
FIG. 6 illustrates one embodiment of a CNR providing audio and modem codecs and a phone line networking interface.

FIG. 6 illustrates one embodiment of a CNR providing audio and modem codecs and a phone line networking interface. CNR 130, as illustrated in FIG. 6, supports phone line networking as described above. CNR 130 also includes audio support circuitry 600 and audio I/O interface 610 to provide audio functionality. Other components can also be included on CNR 130.

Figure 7:
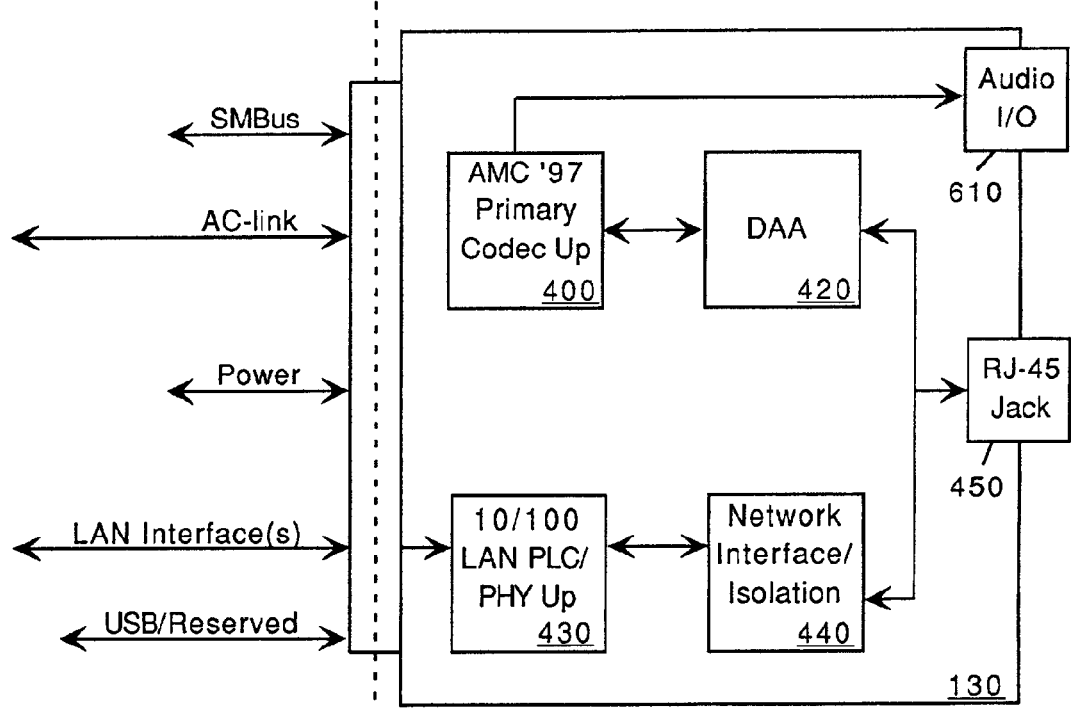
FIG. 7 illustrates one embodiment of a CNR providing an audio/modem codec and a phone line networking interface.

FIG. 7 illustrates one embodiment of a CNR providing an audio/modem codec and a phone line networking interface. FIG. 7 illustrates an alternative embodiment having audio/modem support and phone line networking. Other components can also be included on CNR 130.

Figure 8:
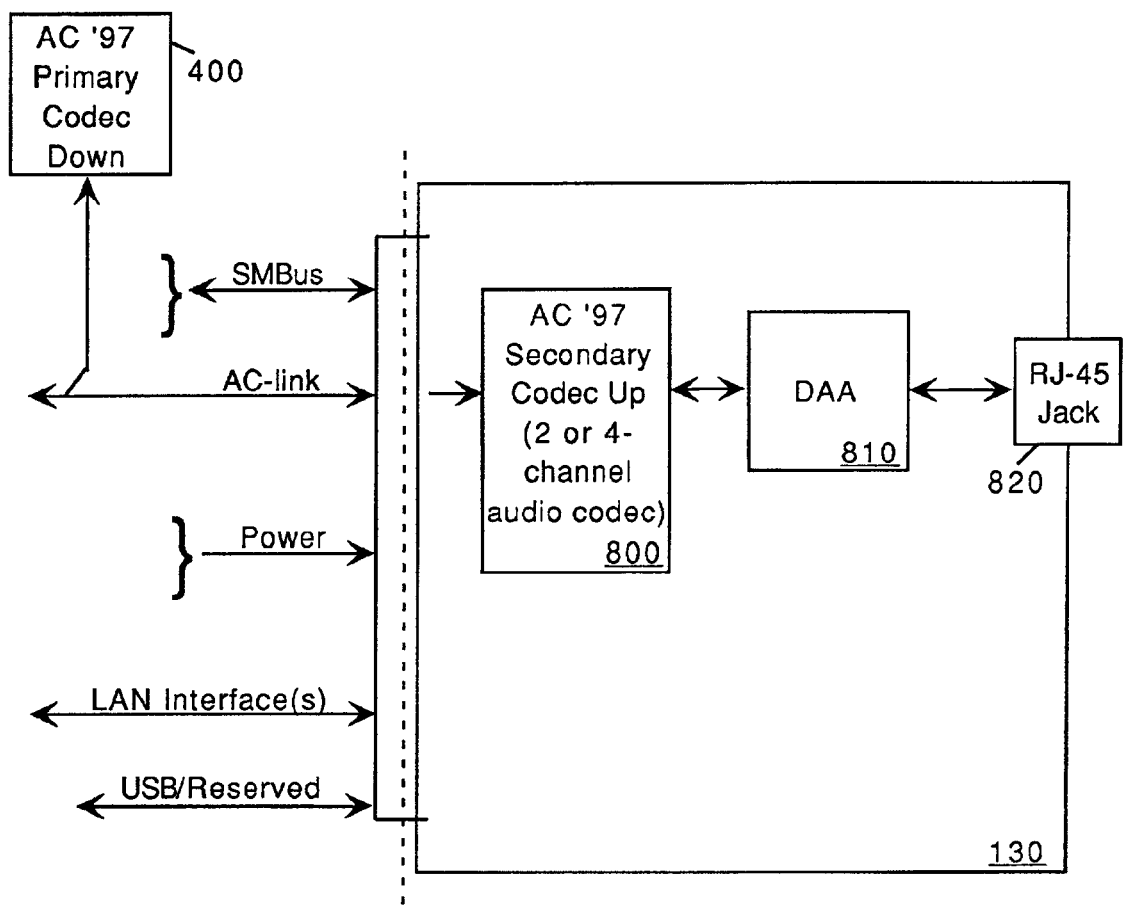
FIG. 8 illustrates one embodiment of a CNR providing a multi-channel audio upgrade to an electronic system containing an audio codec.

FIG. 8 illustrates one embodiment of a CNR providing a multi-channel audio upgrade. FIG. 8 illustrates CNR 130 with AC '97 secondary codec up 800, audio amplifier 810 and audio output jacks 820 to support multi-channel audio. Other components can also be included on CNR 130.

FIGS. 4–8 illustrate situations in which use of a CNR can reduce manufacturing costs. The desired communication and networking solution can be provided by inserting the CNR with the desired functionality without redesign of the motherboard.

In one embodiment, a system implementing an architecture with CNR 130 functionally treats CNR 130 as an extension of motherboard 200. This implies that the BIOS identifies the functionality provided by CNR 130 and implements appropriate support to provide properly configured interfaces. Operating systems have improved in the ability to use standardized registers to uniquely identify hardware added to a system and to provide the appropriate drivers for the hardware. In one embodiment, CNR 130 provides a Plug-and-Play (PnP) type interface.

In one embodiment, the PnP interface includes registers for Vendor ID (VID), Device ID (DID), Subsystem Vendor ID (SVID) and Subsystem ID (SID). Interfaces using other registers and/or identifiers can also be used. Because the front end (either digital or analog) functionality can be provided by different suppliers, with each implementing the surrounding support circuitry in a different manner, the identifiers associated with the functionality of CNR 130 are provided by some component of CNR 130.

In one embodiment PnP information related to CNR 130 is provided to an operating system using a combination of a SMBus based EEPROM and specialized BIOS routines. The electrical interface to the EEPROM is provided on the CNR connector through the signals SMB_SCL, SMB_SDA, SMB_A2, SMB_A1 and SMB_A0, each of which are defined by the SMBus standard. In alternate embodiments, other signals and/or interfaces can be used to provide the PnP information.

In one embodiment, the EEPROM is byte addressable and is SMBus address configurable through external strapping for use on an SMBus that may contain one or more memory devices. Other types of memories can also be used to provide PnP information as described herein.

Figure 9:
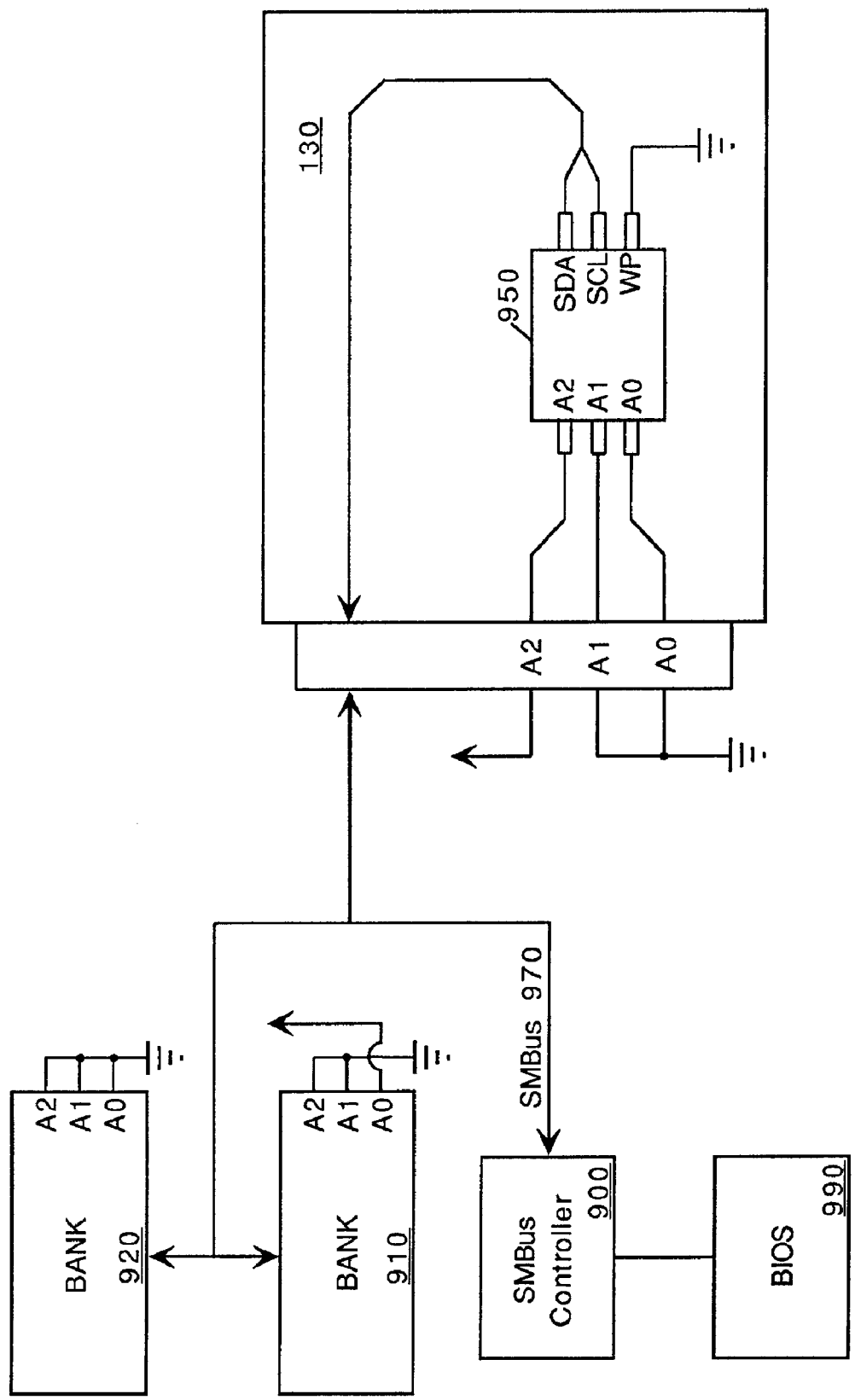
FIG. 9 is a conceptual illustration of a SMBus configuration for use with a riser card and multiple memory devices.

FIG. 9 is a conceptual illustration of one embodiment of a SMBus configuration for use with a riser card and multiple memory devices. FIG. 9 illustrates one embodiment in which memory banks 910 and 920 and EEPROM 950 have unique addresses, which are 001b, 000b and 100b, respectively. SMBus controller 900 communicates with, and controls, memory banks 910 and 920 and EEPROM 950 over SMBus 970. Use and configuration of SMBus 970 and SMBus controller 900 are known in the art.

In one embodiment, EEPROM 950 includes a master configuration space that is used by sequences of instructions stored in BIOS 990 that, when executed, determine the functionality supported by CNR 130. The master configuration space can also be used to determine where, within EEPROM 950, information related to each functionality is located along with the amount of memory each function uses. In one embodiment, instructions within BIOS 990 cause the associated electronic system to determine the functions supported by CNR 130, properly detect front end associated with each function, extract the information within EEPROM 950 associated with each function, and place the extracted data within the registers associated with each function.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A system comprising:
    a motherboard to have a chipset coupled thereto;
    a riser card coupled with the motherboard, the riser card having a circuit thereon that interacts with a corresponding portion of the chipset to provide a functionality to the system, the circuit including a hardware component that has a corresponding driver, the riser card also having a memory to store one or more indications of the functionality, wherein the riser card operates as a logical extension of the motherboard; and
    a memory to store a sequence of instructions, the memory coupled with the motherboard, the sequence of instructions to cause the driver to be loaded based, at least in part, on the one or more indications of the functionality.

2. The system of claim 1 wherein the riser card is coupled with the motherboard via a slot interface having pins corresponding to one or more predetermined industry standards.

3. The system of claim 1 wherein the memory of the riser card is a read-only memory (ROM) and a boot sequence is a basic input/output system (BIOS).

4. The system of claim 1 wherein the functionality comprises one or more audio codecs.

5. The system of claim 1 wherein the functionality comprises one or more modem codecs.

6. The system of claim 1 wherein the functionality comprises support for one or more Universal Serial Bus devices.

7. The system of claim 1 wherein the functionality comprises support for one or more SMBus devices.

8. The system of claim 1 wherein the functionality comprises networking functionality.

9. The system of claim 1 wherein the driver is loaded by an operating system.

10. A riser card comprising:
    an interface to allow the riser card to be coupled with a motherboard having a chipset coupled thereto, the motherboard further having a memory coupled thereto to store a sequence of instructions to cause a driver of the riser card to be loaded based, at least in part, on one or more indications of a functionality provided to a system, wherein the riser card operates as a logical extension of the motherboard;

a circuit that interacts with a corresponding portion of the chipset to provide the functionality to the system; and a memory to store the one or more indications of the functionality.

11. The riser card of claim 10 wherein the riser card is coupled with the motherboard via a slot interface having pins corresponding to one or more predetermined industry standards.

12. The riser card of claim 10 wherein the memory is a read-only memory (ROM) and a boot sequence is a basic input/output system (BIOS).

13. The riser card of claim 10 wherein the functionality comprises one or more audio codecs.

14. The riser card of claim 10 wherein the functionality comprises one or more modem codecs.

15. The riser card of claim 10 wherein the functionality comprises support for one or more Universal Serial Bus devices.

16. The riser card of claim 10 wherein the functionality comprises support for one or more SMBus devices.

17. The riser card of claim 10 wherein the functionality comprises networking functionality.

18. The riser card of claim 10 wherein the driver is loaded by an operating system.

19. A memory comprising an interface to couple with a riser card, the riser card having a circuit thereon that interacts with a corresponding portion of a chipset to provide a functionality to a system, the circuit including a hardware component that has a corresponding driver, the memory to store one or more indications of the functionality, wherein the driver is loaded based, at least in part, on the one or more indications of the functionality, and the riser card operates as a logical extension of the motherboard.

20. The memory of claim 19 wherein the riser card is coupled with a motherboard via a slot interface having pins corresponding to one or more predetermined industry standards.

21. The memory of claim 19 wherein the memory is a read-only memory (ROM).

22. The memory of claim 19 wherein the functionality comprises one or more audio codecs.

23. The memory of claim 19 wherein the functionality comprises one or more modem codecs.

24. The memory of claim 19 wherein the functionality comprises support for one or more Universal Serial Bus devices.

25. The memory of claim 19 wherein the functionality comprises support for one or more SMBus devices.

26. The memory of claim 19 wherein the functionality comprises networking functionality.

27. The memory of claim 19 wherein the driver is loaded by an operating system.

* * * * *